US008457683B2

(12) United States Patent
Gass et al.

(10) Patent No.: US 8,457,683 B2
(45) Date of Patent: Jun. 4, 2013

(54) METHOD FOR ESTABLISHING COMMUNICATION FROM A MOBILE TERMINAL IN DUAL MODE

(75) Inventors: Raymond Gass, Bolsenheim (FR); Jean-Rene Rousseau, Colombes (FR)

(73) Assignee: Alcatel Lucent, Paris (FR)

( * ) Notice: Subject to any disclaimer, the term of this patent is extended or adjusted under 35 U.S.C. 154(b) by 286 days.

(21) Appl. No.: 12/379,855

(22) Filed: Mar. 3, 2009

(65) Prior Publication Data

US 2009/0325635 A1    Dec. 31, 2009

(30) Foreign Application Priority Data

Apr. 2, 2008    (FR) ...................................... 08 01812

(51) Int. Cl.
*H04W 40/00* (2009.01)
*H04M 1/00* (2006.01)
*G06F 15/173* (2006.01)
*H04M 3/42* (2006.01)

(52) U.S. Cl.
USPC ..................... 455/552.1; 455/564; 455/553.1; 455/414.1; 455/445; 709/226; 379/216.01; 379/201.01

(58) Field of Classification Search
USPC ............. 455/552.1, 564, 569.1, 553.1, 414.1, 455/445; 709/226, 266; 379/216.01, 201.01
See application file for complete search history.

(56) References Cited

U.S. PATENT DOCUMENTS

| 2005/0025182 | A1* | 2/2005 | Nazari .......................... 370/469 |
| 2005/0105497 | A1* | 5/2005 | Belkin et al. .................. 370/338 |
| 2006/0068786 | A1 | 3/2006 | Florence |
| 2008/0077691 | A1* | 3/2008 | Park et al. ..................... 709/226 |
| 2008/0167067 | A1* | 7/2008 | Wang .......................... 455/552.1 |
| 2009/0110176 | A1* | 4/2009 | Katapadi ................... 379/216.01 |

FOREIGN PATENT DOCUMENTS

| DE | 103 41 737 | | 4/2005 |
| EP | 1096819 | A1 * | 5/2001 |
| FR | 2 866 184 | | 8/2005 |
| WO | WO 00/41486 | | 7/2000 |
| WO | WO 01/98867 | | 12/2001 |

* cited by examiner

*Primary Examiner* — Jinsong Hu
*Assistant Examiner* — Opiribo Georgewill
(74) *Attorney, Agent, or Firm* — Harness, Dickey & Pierce

(57) ABSTRACT

In the method for establishing communication to a remote terminal from the mobile terminal operating in dual mode, the terminal considers a contact corresponding to the remote terminal. The contact has a string of characters including an identification field containing an identifier of the remote terminal and a description field containing at least one character corresponding to a category to which the identifier contained within the identification field belongs. The terminal analyzes the string of characters. The terminal considers the value of the description field. A rule for establishing communication corresponding to the value is determined. The value of the identification field is considered. A request to establish communication in accordance with the rule is sent to the remote terminal.

15 Claims, 1 Drawing Sheet

METHOD FOR ESTABLISHING COMMUNICATION FROM A MOBILE TERMINAL IN DUAL MODE

TECHNICAL FIELD

The invention pertains to the field of telecommunications, and more particularly radio telecommunications involving mobile terminals operating in dual mode, which are capable of being connected, over the air, to wireless networks of different types, such as a cellular radio communication network (a second-generation one, such as GSM/GPRS, or a third-generation one, such as UMTS), and a WLAN (Wireless Local Area Network) such as WiFi, following the requirements of the IEEE's 802.11 standard.

BACKGROUND

Dual-type mobile terminals have the benefit of enabling the user to choose the type of network over which he wishes to connect in order to establish his communication, such as in order to adapt to the type of network that is accessible (particularly when one of the networks is inaccessible) or for subscription-related reasons, as a transfer over a WiFi network may prove to be more economical than a transfer over a cellular network, which requires a subscription.

In practice, however, the benefit for the user of being able to choose between two types of networks may prove to be problematic, because when establishing communication, the user must always select his terminal's operating mode, which may become tedious in the medium to long term.

Solutions have been proposed in order to reduce the steps performed by the user. One example is French patent application FR 2 866 184, which proposes selecting the network that is best-suited for a communication based on the performance of the networks provided to the terminal by access points, with the terminal making the choice based on predetermined criteria.

Such a solution is entirely satisfactory for some particular uses, particularly when the recipients of the calls made from the terminal all belong to the same category, covered by a single fixed price paid by the subscriber, or by his employer in the circumstances of a business telephony service.

However, it has become apparent that many users whose employer gives them access to a business telephony service use their terminal to make private calls. Although many employers in principle see no drawback to this practice, some feel that the use of the business's network resources by their employees for private purposes must not be encouraged. Call control and/or filtering policies may be instituted, but besides being disliked by employees, they require powerful (and as a result, expensive) analysis and/or filtering means.

No known solutions make it possible to compensate for this drawback: whether the user himself selects the type of network from his terminal, or whether this is done automatically by the terminal in accordance with the operating mode described in the aforementioned patent application, it may prove ineffective when the employer has instituted filters for certain call numbers, so that dual mode loses its attractiveness.

SUMMARY

The invention aims to disclose a solution making it possible to select, from a terminal operating in dual mode, a network based on simple predetermined rules that may be set within the terminal itself, and capable of guaranteeing a streamlined use of network resources.

To that end, the invention, according to a first aspect, discloses a method for establishing communication intended for a remote terminal from a mobile terminal operating in dual mode, said method comprising the following operations:

The terminal considers a contact corresponding to the remote terminal and comprising a string of characters comprising an identification field containing an identifier of the remote terminal, and a description field containing at least one character corresponding to a predetermined category to which the identifier contained within the identification field belongs;

The terminal analyzes the string of characters;

The terminal considers the value of the description field;

A rule for establishing communication corresponding to said value is determined, said rule comprising the communication network being selected from among multiple distinct networks that the terminal may access;

The value of the identification field is considered;

A request to establish communication in accordance with said rule is sent to the remote terminal via the selected network.

For a first preset value of the description field (corresponding, for example, to a private contact), the communication establishment rule may, for example, comprise sending the request via a cellular radio communication network, or, successively, a wireless local area network and a cellular radio communication network. When the wireless local area network is inaccessible or access to it is unauthorized, the communication establishment rule may order a switch to the cellular network.

For a second preset value of the description field (corresponding, for example, to a professional contact), the communication establishment rule may, for example, comprise preferably sending the request via a wireless local area network, or, when this network is inaccessible, via a cellular radio communication network.

The invention, according to a second aspect, discloses a computer program product implemented on a processing unit of an information system, said program comprising instructions for implementing the method described above.

According to a third object, the invention further discloses a mobile terminal operating in dual mode, comprising a processing unit onto which such a computer program product is implemented.

BRIEF DESCRIPTION OF THE DRAWINGS

Other objects and advantages of the invention will become apparent upon reading the description below, with reference to the attached drawings, in which.

DESCRIPTION OF EMBODIMENTS

Figure 1:
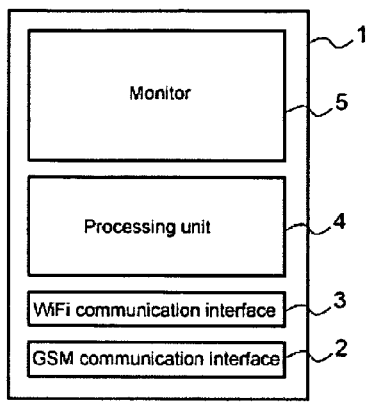
FIG. 1 is a schematic view depicting the architecture of a terminal operating in dual mode.

FIG. 1 depicts a mobile communication 1 configured to operate in dual mode, i.e. to be able to connect to two distinct wireless networks, and for this reason, comprising two distinct communication interfaces. In this example, the terminal 1 is configured to connect to a GSM cellular radio communication network and to a WiFi wireless local area network, and consequently comprises, respectively, a GSM communication interface 2 and a WiFi communication interface 3. These interfaces are controlled by a processing unit 4, which also controls the terminal 1's human/machine interfaces, which include a monitor 5 (depicted in the figure), a keyboard, a microphone, and an earpiece (not depicted).

The terminal 1's internal architecture is not covered by the invention, and consequently will not be described further. For more details on the components of a mobile terminal and their configuration, the person skilled in the art may refer, among others, to the work "Telephones GSM et PC", Patrick Gueule, ETSF, $3^{rd}$ edition, 2006.

When the terminal 1 is powered on, and afterwards on a regular basis, it scans the frequency channels that it is capable of receiving, and creates a list of the networks that are accessible, and among them, a sub-list of authorized networks, i.e. those for which the terminal 1 has an access code. When several networks are both accessible and authorized, the list of these networks may be displayed on the screen 5.

The processing unit 4 comprises an integrated memory, into which an internal directory comprising a list of contacts, to each of which identifiers, or URIs (Uniform Resource Identifier) made up of strings of alphanumeric characters (for example, a telephone number formed by a series of digits, of the format 0123456789, or an email address of the format terminal@remote.com), correspond. An external directory may also be loaded onto the terminal 1 from a SIM card inserted into the terminal 1 in a removable fashion.

The connection to a remote terminal is preceded by a signaling phase wherein the terminal 1 sends the network a communication establishment request comprising the URI of the remote terminal. If the request is accepted by the remote terminal, a communication session is then established between both terminals.

The manner in which the URI may be dialed within the terminal 1 for sending the communication establishment request may be:
  either by loading the URI from an input saved in a directory;
  or by directly typing in the URI using the keyboard.

The URI is contained within an identification field, inside a string of characters corresponding one-to-one to a contact, and further comprising at least one description field accompanying the identification field.

In practice, the contact may comprise three description fields accompanying the identification field, each containing a descriptor made up of one character or a series of characters selected from among a list of preset descriptors, each corresponding to a preset category to which the URI contained within the identification field belongs.

The descriptor(s) may be typed in directly using the keyboard before entering the URI or extracting it from the directory (dynamically using the descriptor(s)), or saved in a directory as a URI prefix, and extracted from the directory at the same time as the URI (statically using the descriptor(s)) when creating the communication establishment request.

Each value of a given descriptor corresponds to its own communication establishment rule, programmed within the processing unit 4 of the terminal 1, and said descriptor complies with said value when said value is identified within a contact entered using a keyboard or loaded from a directory.

Formally speaking, the description field(s) preferably precede the identification field, for which it (or they) form(s) a prefix that the terminal 1 can read even before reading the contents of the identification field.

A first descriptor may, for example, correspond to the private or professional nature of the contact with respect to the terminal 1's user. This example illustrates a situation in which the terminal 1 is made available to an employee by his or her employer, and may be used to contact recipients belonging either to the employee's private life or to his or her professional life. In this example, the categories related to the first descriptor are therefore "private" and "professional" (or "pro"). A preset value for the descriptor corresponds to each of these categories: for example * (star) for a private contact, and # (hash) for a professional contact.

To illustrate this example, a private telephone contact will have the following form:
  *0123456789
  where:
    the identification field contains the URI 0123456789, the telephone number of the remote terminal corresponding to the contact;
    the first description field, introduced as a prefix in the contact, contains the descriptor *, indicating that the URI (and therefore the corresponding contact) belong to the category "private".

Similarly, a professional telephone contact will have the following format:
  #2345678901
  where:
    the identification field contains the URI 2345678901, the telephone number of the remote terminal corresponding to the contact;
    the first description field contains the descriptor #, indicating that the URI belongs to the category "pro".

Figure 2:
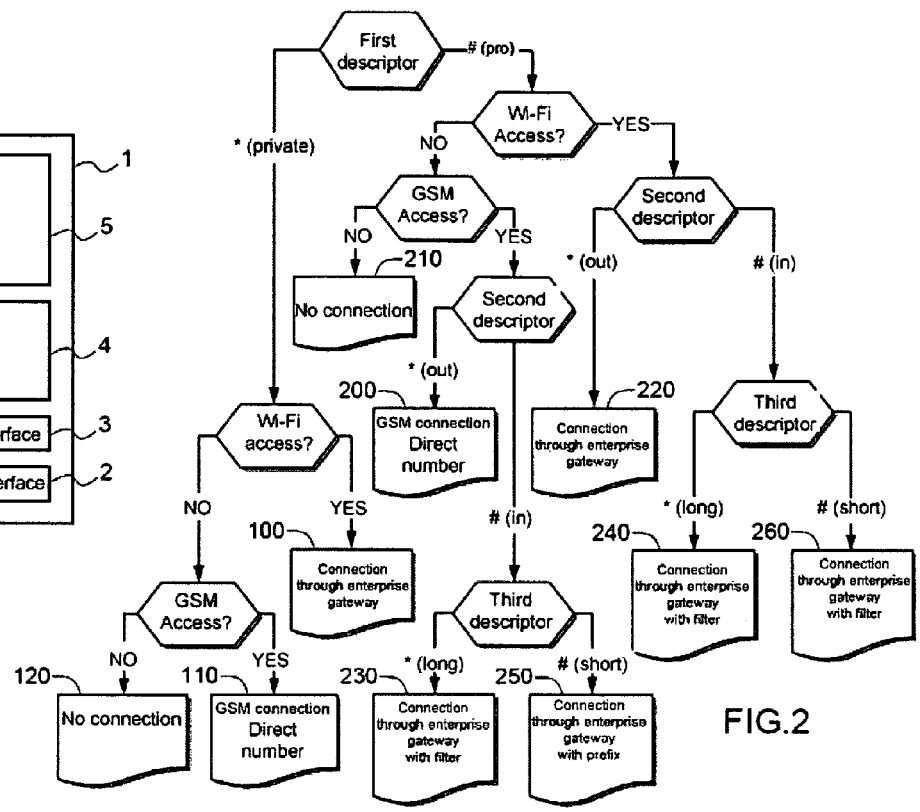
FIG. 2 is a block diagram depicting a method for establishing communication according to one embodiment of the invention.

For the first descriptor's value * (private contact, left-hand branch of the tree in the block diagram in FIG. 2), the communication establishment rule may, for example, be for the terminal 1 to send the communication establishment request directly via a cellular radio communication network. In one variant, as depicted in FIG. 2, the rule may include checking the availability of a priority WLAN network (for example, WiFi) beforehand, and:
  in the event that this WLAN network is accessible, this network sends a request by passing through an enterprise gateway (block 100), with the request potentially later being transmitted by the cellular radio communication network (which does not appear in the diagram);
  in the event that this WLAN network is inaccessible (or unauthorized), switching to the cellular radio communication network, assuming that this network is itself accessible, with the numbering being carried out directly from the URI (block 110). If the cellular network is not available, the connection is not established (block 120).

For the first descriptor's value # (pro contact pro, right-hand branch of the tree of the block diagram in FIG. 2), the communication establishment rule may, for example, comprise the terminal sending the communication establishment request via a WLAN network (for example, WiFi), provided that this network is accessible. In the event that the WLAN network is inaccessible, but the rule may order a switch to a cellular radio communication network, provided that this network is accessible (otherwise, connection to the network is not established).

A second descriptor may be provided, corresponding, for example, to a location (inside a site from which the terminal is sending the request, or conversely, outside that site) and/or to whether or not the contact belongs to the enterprise to which the terminal is assigned. In this example, the categories related to the second descriptor are therefore "outside" (or "out") and "internal" (or "in"). A preset value for the descriptor corresponds to each of these categories: for example * (star) for an outside contact, and # (hash) for an internal contact. In this example, it is understood that the very presence of the second descriptor is affected by the value of the first descriptor. Under the present circumstances, the presence of the second descriptor is only justified in the event that the first descriptor's category is "pro" (value of #).

To illustrate this example, a professional telephone contact will have the following form:

*0123456789 where:
the identification field contains the URI 0123456789, the telephone number of the remote terminal corresponding to the contact;
the first description field contains the descriptor #, indicating that the URI (and therefore the corresponding contact) belongs to the category "pro";
the second description field contains the descriptor *, indicating that the URI belongs to the category "out".

Similarly, an internal professional telephone contact will have the following format:

2345678901 where:
the identification field contains the URI 2345678901, the telephone number of the remote terminal corresponding to the contact;
the first description field contains the descriptor #, indicating that the URI (and therefore the corresponding contact) belongs to the category "pro";
the first description field contains the descriptor #, indicating that the URI belongs to the category "in".

The value of the second descriptor corresponds to a communication establishment rule subject to the terms of the communication establishment rule that corresponds to the first description field.

Thus, the communication establishment rule corresponding to the second descriptor's value * may comprise the following alternative:

In the event that the WLAN network is inaccessible, and that cellular radio communication network is accessible, the request is sent via that network, with the direct and full use of the URI to dial the number (block 200); if the cellular network is inaccessible, the connection is not established (block 210);

In the event that the WLAN network is accessible, the communication establishment request is sent via that network, traveling through a gateway (block 220), and to dial the number, prefixes are added in accordance with conventional call-routing rules, such as the addition of the prefix 0 for an outside call traveling through a PABX (Private Automatic Branch exchange), potentially completed by the prefix 00 for an international call.

When the second descriptor's value is # (internal professional contact), the terminal may apply an additional rule related to the value of a third descriptor, which may, for example, correspond to the number format, either shortened or long-form, which will be dialed by the terminal based on the URI contained within the identification field. In this example, the categories related to the second descriptor are therefore "shortened" (or "short") and "long". Each of these categories corresponds to a preset descriptor value: for example * (star) for a shortened number, and # (hash) for a long-form number.

To illustrate this example, an internal professional telephone contact with a long-form number will have the following format:

*2345678901 where:
the identification field contains the URI 2345678901, the telephone number of the remote terminal corresponding to the contact;
the first description field contains the descriptor #, indicating that the URI (and therefore the corresponding contact) belongs to the category "pro";
the second description field contains the descriptor #, indicating that the URI belongs to the category "in".
the third description field contains the descriptor *, indicating that the URI belongs to the category "long".

Similarly, an internal professional telephone contact with a shortened number will have the following format:

78901 where:
the identification field contains the URI 78901, the telephone number of the remote terminal corresponding to the contact;
the first description field contains the descriptor #, indicating that the URI (and therefore the corresponding contact) belongs to the category "pro";
the second description field contains the descriptor #, indicating that the URI belongs to the category "in".
the first description field contains the descriptor #, indicating that the URI belongs to the category "short".

The third descriptor's value corresponds to a preset communication establishment rule.

Thus, the communication establishment rule corresponding to the third descriptor's value * (long URI) comprises, for example:

in the event that the WLAN network is accessible, and if the cellular radio communication network is accessible (see above the conditions under which these availabilities are verified), the request is sent via the cellular network. As the request is addressed to an internal contact, it is transmitted by the cellular network to the enterprise gateway, which is tasked with routing it to the recipient terminal (block 230). It should be noted that, as the contact is internal, the network located behind the gateway may be configured to support only shortened numbering. As the URI is "long-form", the gateway may consequently apply a filter to it, only retaining, for example, the last five digits. In the example above, in which the full URI is 2345678901, it ends up being stripped of its first five digits by the gateway, with the resulting shortened number being made up of the last five digits, to with 78901;

in the event that the WLAN network is accessible, the communication establishment request is sent via this network, traveling through the enterprise gateway (block 240). If the network only supports shortened numbering, the terminal 1 may, in order to dial the shortened number, apply a filter to a URI, stripping it of needless characters (for example, the first five digits: 23456, so as to retain only the final five: 78901).

The communication establishment rule corresponding to the third descriptor's value # (shortened URI) comprises, for the terminal 1:

in the event that the WLAN network is accessible, and if the cellular radio communication network is accessible (see above the conditions under which these availabilities are verified), the request is sent via the cellular network. As the URI is shortened, the terminal may not directly use it to connect to the cellular network, but must add a prefix corresponding to the full number (block 250). Under the present circumstances, the terminal adds the prefix 23456 to the URI 78901 in order to dial the number 2345678901. However, as the contact is located internally, the network located behind the gateway may be configured to support only shortened numbering. Consequently, the gateway may apply a filter to a full number, only retaining, for example, the last five digits (which actually correspond to the URI as it was initially considered by the terminal);

in the event that the WLAN network is accessible, the communication establishment request is sent via this network, traveling through the enterprise gateway (block 260). If the network supports shortened numbering, the terminal 1 carries out numbering directly based on the URI, with the communication traveling without being filtered by the enterprise gateway.

In order to establish communication, the terminal 1 begins by considering the recipient contact, which is either typed in using the keyboard, or extracted from a directory.

The contact is analyzed by the terminal 1, which considers, within the description field, the value of the descriptor(s), and determines the corresponding communication establishment rule(s).

The terminal 1 also considers the URI within the identification field and sends the remote terminal a communication establishment request in accordance with the communication establishment rule(s) corresponding to the descriptor or combination of descriptors. Example rules are described above. Others may be provided, depending on the configurations of radio networks available and these networks' operating rules (particularly for numbering).

This method is implemented in accordance with the instructions of a computer program installed on the processing unit 4 of the terminal 1. These instructions particularly include all of the communication establishment rules, as described above.

As a result of this method, it is possible to use a terminal in dual mode without requiring the user to select the network through which the communications must travel, with the terminal making the choice itself based on the values of the descriptors associated with the contacts' URIs. Likewise, the user is not constrained by numbering requirements (shortened, long-form).

Moreover, it is possible, based on a directory of contacts without descriptors (i.e. one made up only of URIs), to automatically expand the directory by assigning the URIs descriptors, in accordance with preset rules. For example, the employer may create a list of URIs deemed to correspond to internal contacts, for which a preset communication establishment rule must apply. The corresponding URIs in the terminal's directory are therefore assigned the descriptor #, while the other URIs are assigned the descriptor *. The insertion of the other descriptors may be carried out in a similar fashion, based on preset rules as described above.

The invention claimed is:

1. A method for establishing communication to a remote terminal from a mobile terminal operating in dual mode, comprising:

considering, by the mobile terminal, a contact corresponding to the remote terminal, the contact including an identifier of the remote terminal and a description field, the description field containing a first description field character corresponding to a category to which the identifier belongs, the description field further containing a second description field character indicating a location within the network of the remote terminal, if the first description field character indicates that the contact is a professional contact;

determining, by the mobile terminal a first communication establishment rule and a second communication establishment rule, the first communication establishment rule based upon the first description field character, the first communication establishment rule configured to select a communication network from among multiple distinct networks accessible by the mobile terminal, the second communication establishment rule based upon the second description field character, the second communication establishment rule instructing the mobile terminal to process the identifier differently based on a non-null preset value of the second description field character;

receiving, by the remote terminal, a request to establish communication in accordance with the first communication establishment rule and the second communication establishment rule, the request received via the selected communication network, the first communication establishment rule comprising sending the request via a cellular radio communication network if a first non-null preset value of the first description field character is equal to a first value.

2. The method of claim 1, wherein the first communication establishment rule includes ordering the mobile terminal to send the request via a wireless local area network and the cellular radio communication network, in succession.

3. The method of claim 2, wherein the first communication establishment rule includes switching to the cellular radio communication network when the wireless local area network is inaccessible or access is unauthorized.

4. The method of claim 1, wherein the first preset value of the first description field character corresponds to a private contact.

5. The method of claim 1, wherein, for a second preset value of the first description field character, the first communication establishment rule includes sending the request via a wireless local area network.

6. The method of claim 5, wherein the first communication establishment rule includes sending the request via the cellular radio communication network when the wireless local area network is inaccessible.

7. The method of claim 5, wherein a second preset value of the first description field character corresponds to a professional contact.

8. A computer program product comprising a non-transitory computer-readable medium implemented on a processing unit of a computer system, said computer program product containing computer codes that, when executed, cause a mobile terminal operating in dual mode to establish communication to a remote terminal by, considering, by the mobile terminal, a contact corresponding to the remote terminal, the contact including an identifier of the remote terminal and a description field, the description field containing a first description field character corresponding to a category to which the identifier belongs, the description field further containing a second description field character indicating a location within the network of the remote terminal, if the first description field character indicates that the contact is a professional contact, determining, by the mobile terminal a first communication establishment rule and a second communication establishment rule, the first communication establishment rule based upon the first description field character, the first communication establishment rule configured to select a communication network from among multiple distinct networks accessible by the mobile terminal, the second communication establishment rule based upon the second description field character, the second communication establishment rule instructing the mobile terminal to process the identifier differently based on a non-null preset value of the second description field character, and receiving, by the remote terminal, a request to establish communication in accordance with the first communication establishment rule and the second communication establishment rule, the request received via the selected communication network, the first communication establishment rule comprising sending the request via a cellular radio communication network if a first non-null preset value of the first description field character is equal to a first value.

9. The method of claim 1, wherein the mobile terminal is configured to determine at least two communication establishment rules based upon at least two description field characters.

10. The method of claim 1, wherein the mobile terminal is configured to determine at least three communication establishment rules based upon at least three description field characters.

11. The method of claim 9, wherein a second preset value of the second description field character corresponds to an outside contact.

12. The method of claim 10, wherein a second preset value of the second description field character corresponds to an outside contact.

13. The method of claim 10, wherein a third preset value of a third description field character corresponds to a shortened number.

14. A mobile terminal operating in dual mode, comprising a processing unit on which a computer program product according to claim 8 is implemented.

15. A mobile terminal operating in dual mode, comprising:
a processing unit upon which computer program codes are implemented, the computer program codes when executed causing the mobile terminal to establish communication to a remote terminal by, considering a contact corresponding to the remote terminal, the contact including an identifier of the remote terminal and a description field, the description field containing a first description field character corresponding to a category to which the identifier belongs, the description field further containing a second description field character indicating a location within the network of the remote terminal, if the first description field character indicates that the contact is a professional contact, determining a first communication establishment rule and a second communication establishment rule, the first communication establishment rule based upon the first description field character, the first communication establishment rule configured to select a communication network from among multiple distinct networks accessible by the mobile terminal, the second communication establishment rule based upon the second description field character, the second communication establishment rule instructing the mobile terminal to process the identifier differently based on a non-null preset value of the second description field character, and sending a request to establish communication in accordance with the first communication establishment rule and the second communication establishment rule, the request sent via the selected communication network, the first communication establishment rule comprising sending the request via a cellular radio communication network if a first non-null preset value of the first description field character is equal to a first value.

* * * * *